United States Patent
Vinapamula Venkata

(10) Patent No.: US 9,253,025 B1
(45) Date of Patent: Feb. 2, 2016

(54) REQUESTING HIGH AVAILABILITY FOR NETWORK CONNECTIONS THROUGH CONTROL MESSAGES

(71) Applicant: Juniper Networks, Inc., Sunnyvale, CA (US)

(72) Inventor: Suresh Kumar Vinapamula Venkata, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 102 days.

(21) Appl. No.: 14/230,795

(22) Filed: Mar. 31, 2014

(51) Int. Cl.
*H04L 12/26* (2006.01)
*H04L 12/24* (2006.01)

(52) U.S. Cl.
CPC .................... *H04L 41/0654* (2013.01)

(58) Field of Classification Search
CPC .................................................. H04L 41/0654
See application file for complete search history.

(56) References Cited

U.S. PATENT DOCUMENTS

| | | | |
|---|---|---|---|
| 6,735,206 B1 * | 5/2004 | Oki | H04L 29/06 370/392 |
| 6,748,437 B1 * | 6/2004 | Mankude | H04L 29/06 709/219 |
| 7,184,437 B1 | 2/2007 | Cole et al. | |
| 8,650,279 B2 | 2/2014 | Mehta et al. | |
| 2006/0262716 A1 * | 11/2006 | Ramaiah | H04L 69/16 370/216 |
| 2006/0262734 A1 * | 11/2006 | Appanna | H04L 45/121 370/254 |
| 2008/0044181 A1 | 2/2008 | Sindhu | |
| 2015/0113588 A1 * | 4/2015 | Wing | H04L 63/0227 726/1 |

OTHER PUBLICATIONS

Penno et al. "Application Enabled SDN (A-SDN)" draft-penno-pcp-asdn-00, Network Working Group, Internet-Draft, Sep. 29, 2013, 12 pgs.
Vinapamula et al. "Flow High Availability through PCP" draft-vinapamula-flow-ha-00, Network Working Group, Internet-Draft, Oct. 14, 2013, 5 pgs.
Wing et al. "PCP Extension for Third Party Authorization" draft-wing-pcp-third-party-authz-01, PCP, Internet-Draft, Sep. 13, 2013, 16 pgs.
Wing et al. "Port Control Protocol (PCP)" Internet Engineering Task Force (IETF), RFC 6887, Apr. 2013, 88 pgs.
U.S. Appl. No. 13/326,903, filed Dec. 15, 2011 entitled Deterministic Network Address and Port Translation.
U.S. Appl. No. 61/054,692, filed May 20, 2008 entitled Streamlined Packet Forwarding Using Dynamic Filters for Routing and Security in a Shared Forwarding Plane.

\* cited by examiner

*Primary Examiner* — Clemence Han
(74) *Attorney, Agent, or Firm* — Shumaker & Sieffert, P.A.

(57) ABSTRACT

In one example, a network device includes one or more network interfaces configured to receive a message according to a protocol for reserving a public Internet protocol (IP) address and port for a network connection and to receive one or more packets of a packet flow associated with the public IP address and the port for the network connection, and one or more processors comprising a primary service device, wherein the processors are configured to determine whether the message includes an indication that the network connection is to be checkpointed for high availability, and wherein the primary service device is configured to, based on the indication, checkpoint data of at least one of the received packets to a backup service device. Accordingly, a message of a protocol for reserving a public network address and port may be used to indicate whether a network connection should be checkpointed for high availability.

39 Claims, 7 Drawing Sheets

REQUESTING HIGH AVAILABILITY FOR NETWORK CONNECTIONS THROUGH CONTROL MESSAGES

TECHNICAL FIELD

This disclosure relates to computer networks, and more particularly, to providing high availability services for network connections.

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server or other device in each subnet may be responsible for allocating these network addresses in accordance with a network address allocation protocol, such as a dynamic host configuration protocol (DHCP).

In some cases, a network connection may be provided with a high availability service. Another term used to describe high availability is uninterrupted service. Uninterrupted service continuity is very important in Internet environments. Typically, high availability services are provided by checkpointing data of a network connection, such as network session state data (e.g., current synchronization number, current acknowledgement number, etc.).

Such services are provided by deploying active-backup pairs of devices in a system. That is, a primary device checkpoints data of a network connection to a backup device such that, in the event that the primary device is taken down (e.g., fails or is voluntarily taken offline), the backup device can resume participation in the network connection, to avoid premature termination of the network connection. Relatively long-lived network connections are typically provided high availability services, whereas such services are typically not provided to relatively short-lived network connections. For some stateful services, such as network address translation (NAT), a state is created per packet flow, and this state is checkpointed from the primary device to the backup device for high availability.

SUMMARY

In general, this disclosure describes techniques for providing high availability to network connections. This disclosure recognizes that there are some times when relatively long-lived network connections do not actually need high availability, and similarly, that there are times when relatively short-lived network connections should be provided high availability. That is, this disclosure recognizes that whether a network connection is relatively long lived or relatively short lived is not necessarily sufficient information for determining whether that connection should be checkpointed for high availability. Moreover, this disclosure recognizes that network connections needing high availability services should, in some cases, be checkpointed early (e.g., when the network connection is initiated), rather than only after a certain period of time to determine whether the network connection is long lived or not. The techniques of this disclosure may be used to initiate checkpointing at any time, e.g., when the network connection is initially established or after an arbitrary period of time following establishment of the network session.

In general, this disclosure describes techniques in which a client device (e.g., based on instructions from an executed application and/or a user) sends data indicating whether a particular network connection should be provided with a high availability service. For example, an application and/or user may define if a network connection is considered critical, and hence, whether the network connection should be provided with a high availability service. To indicate that a network connection is critical, the client device may send data as part of an Internet protocol (IP) address and port reservation protocol message, such as a message in accordance with Port Control Protocol (PCP) in which an explicit mapping between an external (public) IP address/port an internal (private) IP address/port can be requested (reserved). A device providing high availability services may therefore determine whether to checkpoint data for a network connection based on whether the data of the IP address and port reservation protocol message indicates that the network connection is critical (that is, should be checkpointed). In this manner, the techniques of this disclosure may be based on the principle that an end system and/or user knows which connections are critical.

In one example, a method includes receiving, in a message according to a protocol for reserving a public Internet protocol (IP) address and port for a network connection, an indication that the network connection is to be checkpointed for high availability, receiving one or more packets of a packet flow associated with the public IP address and the port for the network connection, and, based on the indication, checkpointing, by a primary service device, data of at least one of the received packets to a backup service device for the primary service device.

In another example, a network device includes one or more network interfaces configured to receive a message according to a protocol for reserving a public Internet protocol (IP) address and port for a network connection and to receive one or more packets of a packet flow associated with the public IP address and the port for the network connection, and one or more processors comprising a primary service device, wherein the processors are configured to determine whether the message includes an indication that the network connection is to be checkpointed for high availability, and wherein the primary service device is configured to, based on the indication, checkpoint data of at least one of the received packets to a backup service device for the primary service device.

In another example, a non-transitory computer-readable storage medium comprising instructions that, when executed, cause a processor to receive, in a message according to a protocol for reserving a public Internet protocol (IP) address and port for a network connection, an indication that the network connection is to be checkpointed for high availability, receive one or more packets of a packet flow associated with the public IP address and the port for the network connection, and, based on the indication, checkpoint data of at least one of the received packets.

In another example, a method includes determining, by a client device, whether a network connection associated with the client device and a network device is to be checkpointed for high availability, wherein the network device comprises a primary service device that provides a high availability service, constructing, by the client device, a message according to a protocol for reserving a public network address and port to be used for the network connection, such that the message includes an indication of whether the network connection is to be checkpointed for high availability based on the determination, and sending, by the client device, the message to the network device.

In another example, a client device includes one or more processors configured to determine whether a network connection associated with the client device and a network device is to be checkpointed for high availability and to construct a message according to a protocol for reserving a public network address and port to be used for the network connection, such that the message includes an indication of whether the network connection is to be checkpointed for high availability based on the determination, wherein the network device comprises a primary service device that provides a high availability service, and one or more network interfaces configured to send the message to the network device.

In another example, a computer-readable storage medium has stored thereon instructions that, when executed, cause a processor of a client device to determine whether a network connection associated with the client device and a network device is to be checkpointed for high availability, wherein the network device comprises a primary service device that provides a high availability service, construct a message according to a protocol for reserving a public network address and port to be used for the network connection, such that the message includes an indication of whether the network connection is to be checkpointed for high availability based on the determination, and send the message to the network device.

The details of one or more examples are set forth in the accompanying drawings and the description below. Other features, objects, and advantages will be apparent from the description and drawings, and from the claims.

DETAILED DESCRIPTION

Figure 1:
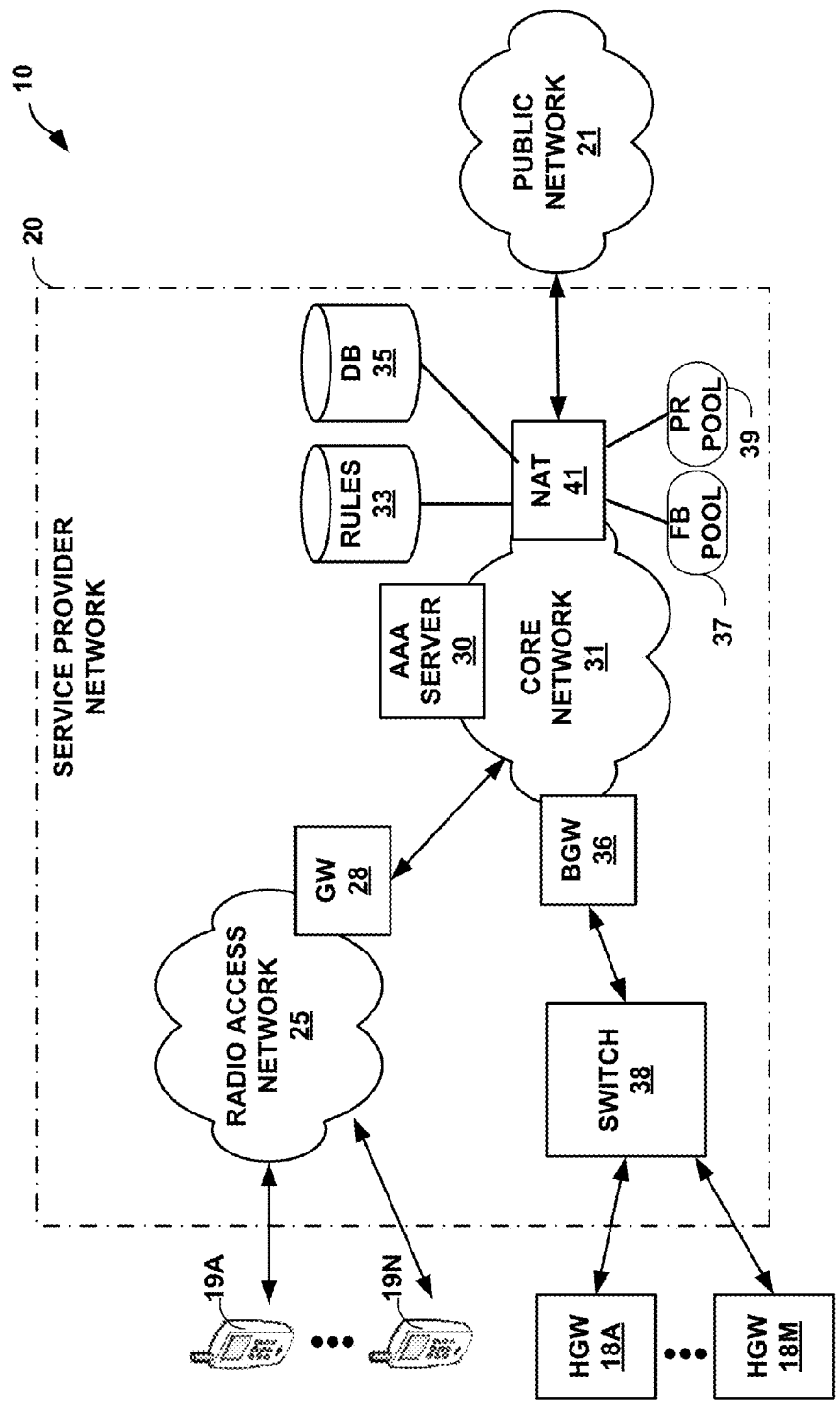
FIG. 1 is a block diagram illustrating an exemplary network system that implements the techniques for determining whether a network connection is critical for the purposes of checkpointing data for high availability as described in this disclosure.

FIG. 1 is a block diagram illustrating an exemplary network system 10 that implements the techniques for determining whether a network connection is critical for the purposes of checkpointing data for high availability described in this disclosure. As shown in the example of FIG. 1, network system 10 includes a service provider network 20 and a public network 21. In the example of FIG. 1, service provider network 20 operates as a private network that provides packet-based network access to home gateways ("HGWs") 18A-18M that service endpoint computing devices, such as personal computers, laptop computers or other types of computing device associated with subscribers. In addition, service provider network 20 may provide data services to cellular mobile devices 19A-19N. Mobile devices 19 may comprise, for example, mobile telephones, laptop or desktop computers having, e.g., 3G wireless cards, wireless-capable netbooks, video game devices, pagers, smartphones, or personal data assistants (PDAs). Each of mobile devices 19 may run one or more applications, such as mobile calls, video games, videoconferencing, and email, among others.

In accordance with the techniques of this disclosure, mobile devices 19 may determine whether a network connection is critical (i.e., should be checkpointed for high availability) based on various criteria. For instance, mobile devices 19 may receive user input and/or configuration data indicative of whether individual network connections and/or types of network connections should be checkpointed for high availability. In accordance with the techniques of this disclosure, mobile devices 19 may construct messages (e.g., according to a protocol for reserving a network address, such as an Internet protocol (IP) address and port) that indicate whether a corresponding network connection should be checkpointed for high availability.

In the example of FIG. 1, HGWs 18 connect to a broadband network gateway (BGW) 36 via network switch 38. In one example, HGWs may be DSL modems and network switch 38 may comprise a digital subscriber line access multiplexer (DSLAM) or other switching device. Each of HGWs 18 may utilize a Point-to-Point Protocol (PPP), such as PPP over ATM or PPP over Ethernet (PPPoE), to communicate with network switch 38. For example, using PPP, one of HGWs 18 may request access to core network 31 and provide login information, such as a username and password, for authentication by AAA server 30. PPP may be supported on lines, such as digital subscriber lines (DSLs), that connect endpoint computing devices 18 with network switch 38. In other examples, endpoint computing devices 18 may utilize a non-PPP protocol to communicate with network switch 38. Other examples may use other lines besides DSL lines, such as cable, Ethernet over a T1, T3 or other access links.

Network switch 38 may communicate with broadband network gateway 36 over a physical interface supporting various protocols, e.g., ATM interface supporting ATM protocols. Broadband network gateway 36 typically includes Broadband Remote Access Server (BRAS) functionality to aggregate output from switches into a higher-speed uplink to core network 31. In some examples, broadband network gateway 36 may comprise a router that maintains routing information between endpoint computing devices 18 and core network 31.

Service provider network 20 may also include radio access network 25 in which one or more base stations communicate via radio signals with mobile devices 19. Radio access network 25 is a transport network that enables base stations to exchange packetized data with core network 31 of the service provider, ultimately for communication with packet data network 21. Radio access network 25 typically comprises communication nodes interconnected by communication links, such as leased land-lines or point-to-point microwave connection. The communication nodes comprise network, aggregation, and switching elements that execute one or more protocols to route packets between base stations and gateway device ("GW") 28. Core network 31 provides session management, mobility management, and transport services between backhaul network 27 and core network 31 to support access, by mobile devices 19, to public network 21 and services of protected resources 14. Core network 31 may comprise, for instance, a general packet radio service (GPRS) core packet-switched network, a GPRS core circuit-switched network, an IP-based mobile multimedia core network, or another type of transport network. Core network 31 typically includes one or more packet processing nodes to support firewall, load balancing, billing, deep-packet inspection (DPI), and other services for mobile traffic traversing the mobile core network.

AAA server 30 is typically an authentication, authorization and accounting (AAA) server to authenticate the credentials a subscriber requesting a network connection. The AAA server 30 may be integrated within a router or gateway of broadband network or on a separate network device and may be, for example, a Remote Authentication Dial-In User Service (RADIUS) server. Upon authenticating a network access request from either an HGW 18 or a mobile device 19, AAA server 30 assigns a private layer three (L3) network address (e.g., an IPv4 network address) for receiving data services within service provider network 20. This may be accomplished in a variety of ways. For example, the private network address may be statically configured on the subscriber device or may be dynamically or statically assigned by AAA server 30 (or gateway 28). Typically, upon authentication of the subscriber, AAA server 30 selects a private IP address from a pool of private network addresses. In some cases, BGW 36 or GW 28 may send a Radius authentication request to AAA server 30 for authentication and assignment of an IP address.

Network address translation (NAT) device 41 provides network address translation for private network addresses routable within service provider network 20 to public network addresses routable within public network 21. NAT device 41 applies a source network address and port translation (NAPT) mechanism that may reduce or even eliminate the need for the service provider to generate and maintain logs of NAT translations. NAT device 41 may be configured to reserve IP addresses and ports in accordance with the techniques of Kamisetty et al., "DETERMINISTIC NETWORK ADDRESS AND PORT TRANSLATION," U.S. patent application Ser. No. 13/326,903, filed Dec. 15, 2011, the entire contents of which are incorporated herein by reference. In some examples, functionality attributed to NAT device 41 may be included in another network device, such as an edge router. For instance, as explained with respect to FIG. 2, a router may include a service card configured to perform the functionality attributed to NAT device 41.

In accordance with the techniques of this disclosure, NAT device 41 may additionally provide high availability services to network connections. Although NAT device 41 is described as performing techniques of this disclosure, it should be understood that other devices that provide services in addition to or in the alternative to NAT may be configured to perform the techniques of this disclosure. In one example, NAT device 41 is configured to determine whether to provide high availability services to a network connection. For instance, when a client device, such as one of mobile devices 19, sends a message according to a protocol for reserving a public address (e.g., an Internet protocol (IP) address) and a port for a network connection to NAT device 41 (i.e., creating a mapping between the public address/port and a private address/port of the client device), the message may additionally include data indicating that the corresponding network connection is to be checkpointed for the purposes of high availability. NAT device 41 therefore uses such data, when present, to determine that high availability services are to be applied to the network connection.

One example of a protocol for creating a mapping between a public address/port and private network address/port for a network connection is Port Control Protocol (PCP), which is defined in Wing et al., "Port Control Protocol (PCP)," Internet Engineering Task Force, RFC 6887, April 2013, which is available at https://tools.ietf.org/html/rfc6887 and incorporated by reference herein. In general, PCP allows applications to create mappings from an external IP address, protocol, and port to an internal IP address, protocol, and port. These mappings are often required for successful inbound communications destined to machines located behind a NAT or a firewall. In accordance with the techniques described herein, NAT device 41 may determine whether a field of a PCP header that RFC 6887 defines as being "reserved" has a value indicating that the corresponding network connection is to be checkpointed for high availability. That is, in accordance with the techniques of this disclosure, such a reserved field as defined in RFC 6887 may be repurposed for indicating whether a network connection is to be checkpointed for high availability. In one example, a zero-value for the field in the PCP header indicates that the network connection is to be checkpointed for high availability, and a non-zero value indicates that the network connection is not to be checkpointed.

In this manner, according to this example, NAT device 41 determines whether a field in the PCP message from the client device has a value indicating that the network connection is critical (i.e., is to be checkpointed for high availability). In the case that the value of the field indicates that the network connection is not to be checkpointed, NAT device 41 may avoid sending state information to a backup network device (e.g., a backup service card of NAT device 41 or a backup NAT device separate from NAT device 41, not shown in FIG. 1). In some implementations, NAT device 41 checkpoints even connections identified as non-critical when a threshold level of resources are freely available. On the other hand, in the case that the value of the field indicates that the network connection is critical, NAT device 41 checkpoints state information to the backup network device. Checkpointed state information may include, for example, a current sequence number for a packet flow (e.g., in accordance with Transmission Control Protocol (TCP)), a current acknowledgement for the packet flow (again in accordance with TCP), or the like.

The techniques of this disclosure thereby allow a client device to determine whether a connection is critical (that is, should be checkpointed for a high availability service), and if so, send data to a server device (such as NAT device 41) indicating that the connection is critical. The client device may determine whether the connection is critical based on any of a variety of criteria. For instance, the client device may determine whether a connection is critical based on a connection type, e.g., all phone conversations, whether the connection is short lived or long lived. Additionally or alternatively, a client system (which may also provide a service to sub-client devices) may determine that connections associated with users that have paid-for accounts are critical, whereas users that have free or basic accounts are not critical.

In some examples, assuming that a network connection is to be checkpointed, NAT device 41 may checkpoint state information (e.g., sequence number and/or acknowledgement number) for one or more packet flows associated with the network connection. Typically, a network connection is defined by two packet flows: a first packet flow from the client device to the server device participating in the network connection, and a second packet flow from the server device to the client device. Each packet flow has a current sequence number state and a current acknowledgement number state. Thus, to checkpoint a network connection, NAT device 41 (or other devices performing the techniques of this disclosure) may checkpoint sequence numbers and/or acknowledgement numbers for any or all packet flows associated with the network connection.

In some examples, an administrator (not shown in FIG. 1) may configure NAT device 41 such that a finite number of network connections can be checkpointed at the same time. In such instances, if a PCP message associated with a network connection indicates that the network connection is critical, but the maximum number of network connections is currently being checkpointed, NAT device 41 may respond to the PCP message from the client device with data indicating that checkpointing will not be performed for the network connection. In this manner, NAT device 41 may prevent a rogue users from exhausting resources of NAT device 41 related to high availability.

In the case that checkpointing is possible, NAT device 41 may respond to the PCP message with a PCP response, sent to the requesting client device. The PCP response may indicate that the network connection will be checkpointed. In some examples, a response is not sent, but instead, NAT device 41 simply checkpoints data for the network connection. Furthermore, NAT device 41 may begin checkpointing data for the network connection even before sending the PCP response to the client device.

In some examples, when a client device (such as one of mobile devices 19) indicates that a network connection is critical in accordance with the techniques of this disclosure, such a request may be applicable for a limited amount of time. That is, the client device may have a subscription for a high availability service that is limited in time and may expire. Thus, NAT device 41 may unsubscribe the client device from the high availability service after expiration of the high availability service. This may result in NAT device 41 clearing an existing connection state on a backup device for the corresponding connection, e.g., by sending an aggregated message or individual message per connection. Alternatively, the state may be left as-is at the time of expiration of the high availability service, without checkpointing new state information for the network connection.

NAT device 41, or other devices performing the techniques of this disclosure, may be configured to perform any or all of the techniques described in Penno et al., "Application Enabled SDN (A-SDN)," Network Working Group, document draft-penno-pcp-asdn-00, Sep. 29, 2013, available at http://tools.ietf.org/html/draft-penno-pcp-asdn-00, which is hereby incorporated by reference in its entirety.

Figure 2:
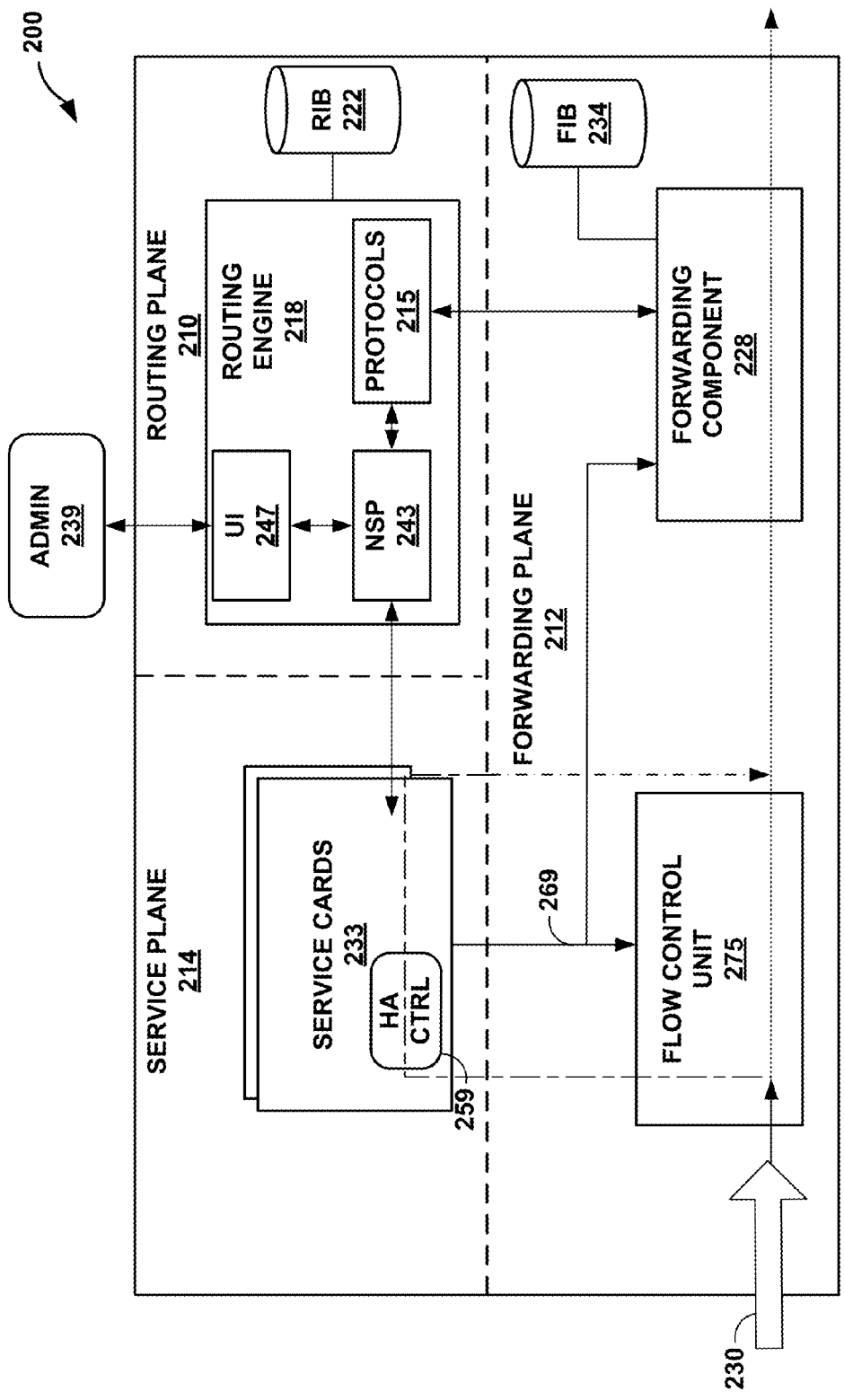
FIG. 2 illustrates an example network device that incorporates the techniques described herein for determining whether a network connection is critical for the purposes of checkpointing data for high availability.

FIG. 2 illustrates an example network device 200 that incorporates the techniques for determining whether a network connection is critical for the purposes of checkpointing data for high availability described herein. In this example, network device 200 may be a standalone device or a router or gateway device, such as BGW 36 or GW 28 of FIG. 1. Network device 200 may perform the functions described above with respect to NAT device 41 of FIG. 1. As such example, network device 200 may, for example, be a high-end router or gateway capable of deployment within a service provider network.

In the example of FIG. 2, the components of network device 200 may be logically organized into a routing plane 210, a forwarding plane 212 and a service plane 214. Routing plane 210 provides a routing engine 218 that is primarily responsible for maintaining a routing information base (RIB) 222 to reflect the current topology of a network and other network entities to which network device 200 is connected. For example, routing engine 218 provides an operating environment for execution of routing protocols 215 that communicate with peer routers and periodically update RIB 222 to accurately reflect the topology of the network and the other network entities. Example protocols include routing and label switching protocols, such as BGP, ISIS, RSVP-TE and LDP. In some examples, network device 200 may be a mobile gateway having a distributed control plane for handling mobile subscribers, such as described within U.S. patent application Ser. No. 13/172,556, entitled "MOBILE GATEWAY HAVING DECENTRALIZED CONTROL PLANE FOR ANCHORING SUBSCRIBER SESSIONS," which is hereby incorporated herein by reference. In this case, as a mobile gateway, device 200 may have a plurality of session management cards, each handling control functions for a plurality of the subscriber sessions. Each of the session management cards may perform the deterministic NAT techniques described herein for the subscriber sessions assigned to the session management card, and/or functions of other services, such as IPSec, for which state information is checkpointed for high availability.

Forwarding plane 212 receives and forwards packets associated with network packet flows 230. Forwarding component 228 maintains forwarding information base (FIB) 234 in accordance with RIB 222, which associates network destinations or MPLS labels with specific next hops and corresponding interface ports of output interface cards of network device 200. Routing engine 218 typically processes RIB 222 to perform route selection and generate FIB 234 based on selected routes. In this way, next hop information may be programmed into forwarding plane 212. Routing engine 218 may generate FIB 234 in the form of a radix tree having leaf nodes that represent destinations within the network. U.S. Pat. No. 7,184,437, the contents of which is incorporated herein by reference in its entirety, provides details on an example of a router that utilizes a radix tree for route resolution.

When forwarding a packet, forwarding component 228 traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface. Forwarding plane 212 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

In this way, network device 200 integrates service plane 214 and routing plane 210 to utilize shared forwarding plane 212. Forwarding plane 212 may be a rich and dynamic shared forwarding plane, optionally distributed over a multi-chassis router. Moreover, forwarding plane 212 may be provided by dedicated forwarding integrated circuits normally associated with high-end routing components of a network router. Consequently, routing plane 210 and forwarding plane 212 may operate as a high-end router or gateway, and service plane 214 has been tightly integrated within network device 200 (e.g., by way of service cards 233) so as to use forwarding plane 212 of the routing components in a shared, cooperative manner. Further details of one example of network device 200 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," the entire contents of which is incorporated herein by reference.

Network services process (NSP) 243 of routing engine 218 communicates with and programs service cards 233 of service plane 214. In response, NSP 243 programs services cards 233 with corresponding configuration data, causing the service cards of service plane 214 to perform the functions described herein when processing packets redirected from forwarding plane 212. One or more of service cards 233 may, for example, execute a NAT controller (not explicitly shown in FIG. 2) that operates on packets for new subscriber communication flows to dynamically determine a public network address and port range.

In accordance with the techniques of this disclosure, one or more of service cards 233 may include a high availability control unit (HA CTRL) 259, which further determines whether a network connection should be provided with high availability services. For instance, HA CTRL 259, which may be included in one of service cards 233 that also performs NAT (or another service for which state information can be checkpointed for high availability), may determine whether a PCP message includes data indicating whether a corresponding network connection should receive HA services.

Forwarding plane 212 includes flow control unit 275 to selectively direct packets of newly detected communication sessions to service plane 214 for processing. For example, flow control unit 275 receives incoming packet flows 230 (e.g., outbound subscriber traffic) and determines whether to send the packets through the service plane 214 for processing within one or more of service cards 233, or whether to bypass the service plane 214. Service cards 233 receive packets from flow control unit 275, computes NAT information to select a public network address and port for the communication flow, configures forwarding component 228 in accordance with the computed information, and relays the packet or any response packets to forwarding plane 212 for forwarding by forwarding component 228 in accordance with FIB 234.

Moreover, one of service cards 233 may be configured as a primary high availability service device. Another one of service cards 233 may act as a backup device for the purposes of high availability. Alternatively, a service card of a separate network device (i.e., separate from network device 200) may be configured to act as a backup device. In any case, the primary device (e.g., the primary service card) checkpoints state data for a network connection for which a high availability service is to be provided, e.g., a network connection determined to be critical.

For example, HA CTRL 259 may determine that a network connection is critical or otherwise to be provided active/standby high-availability service when a PCP request (or other message in accordance with a protocol for reserving a public IP address and protocol) associated with the network connection indicates that the network connection is critical. In response, HA CTRL 259, or another element of service plane 214, may configure flow control unit 275 such that, when packets associated with the network connection are received, such packets are sent to HA CTRL 259, such that HA CTRL 259 can replicate state information associated with the network connection to the backup device (e.g., a backup service card of service cards 233 or a backup device separate from network device 200).

Moreover, one or more of service cards 233 may be configured to perform network address translation (NAT). In particular, when a PCP request associated with the network connection is received, one of service cards 233 performing NAT may map a reserved, public IP address and/or port to a private IP address and/or port of the requesting device (e.g., a client device, such as one of mobile devices 19). Such mapping data may be stored in FIB 234. In this manner, when a packet is received that specifies the public IP address and port reserved for the network connection, forwarding component 228 (using the mapping data of FIB 234) forwards the packet to the corresponding client device, e.g., the appropriate one of mobile devices 19.

Additionally or alternatively, one of service cards 233 may be configured to provide an Internet protocol security (IPsec) service for a network connection. Such a service card may also utilize the techniques of this disclosure. For example, the IPsec service card may determine that a network connection is critical or otherwise to be provided HA service, and replicate security state information to a backup IPsec service device (e.g., one of service cards 233 or a separate device from network device 200). The IPsec service card may utilize data of a message in accordance with a protocol for reserving a public IP address and port to determine that the network connection is critical, as discussed above.

Service cards 233 within service plane 214 may be installed along a backplane or other interconnect of network device 200 to perform a variety of other services on the packets received from forwarding plane 212, such as filtering, logging, Intrusion Detection and Prevention (IDP) analysis, virus scanning, deep packet inspection. In some cases, service card 233 may issue commands 269 to dynamically configure a flow table within flow control unit 275 of forwarding plane 212. For example, when flow control unit 275 receives a packet and determines that the packet belongs to a new packet flow that does not match any of its filters, flow control unit 275 may send the packet to service cards 233 for processing and initial computation and assignment of a public address and port, as described for exemplary purposes with respect to FIGS. 1 and 2.

Service cards 233 may generally be referred to as processors or processing units, although it should be understood that service cards 233 may be implemented solely or in any combination of hardware, software, and/or firmware. It is presumed that when implemented in software or firmware, requisite hardware for executing software or firmware instructions is also provided, such as one or more hardware-based processing units. Other types of hardware-based processing units that may implement service cards 233 include digital signal processors (DSPs), field-programmable gate arrays (FPGAs), application specific integrated circuits (ASICs), microprocessors, and the like. It should also be understood that network device 200 includes one or more network interfaces (e.g., network interface cards (NICs)) configured to send and receive network data, e.g., packets of packet flow 230.

Although service plane 214 is shown as being present on network device 200 in the example of FIG. 2, it should be understood that in other examples, service plane 214 may include service cards that are not included within network device 200. For example, in addition to or in the alternative to the example shown in FIG. 2, service cards may be remotely tethered to network device 200, and such service cards may be considered part of service plane 214. Additionally or alternatively, network device 200 may receive virtual services, which may be considered part of service plane 214. Furthermore, either of a primary service device and a backup service device may be present physically within network device 200 (e.g., as one of service cards 233), a remote device tethered to network device 200, and/or provided as a virtual device.

In this manner, network device 200 represents an example of a network device including one or more network interfaces configured to receive a message according to a protocol for reserving a public Internet protocol (IP) address and port for a network connection and to receive one or more packets of a packet flow associated with the public IP address and the port for the network connection, and one or more processors comprising a primary service device, wherein the processors are configured to determine whether the message includes an indication that the network connection is to be checkpointed for high availability, and wherein the primary service device is configured to, based on the indication, checkpoint data of at least one of the received packets to a backup service device for the primary service device.

Figure 3:
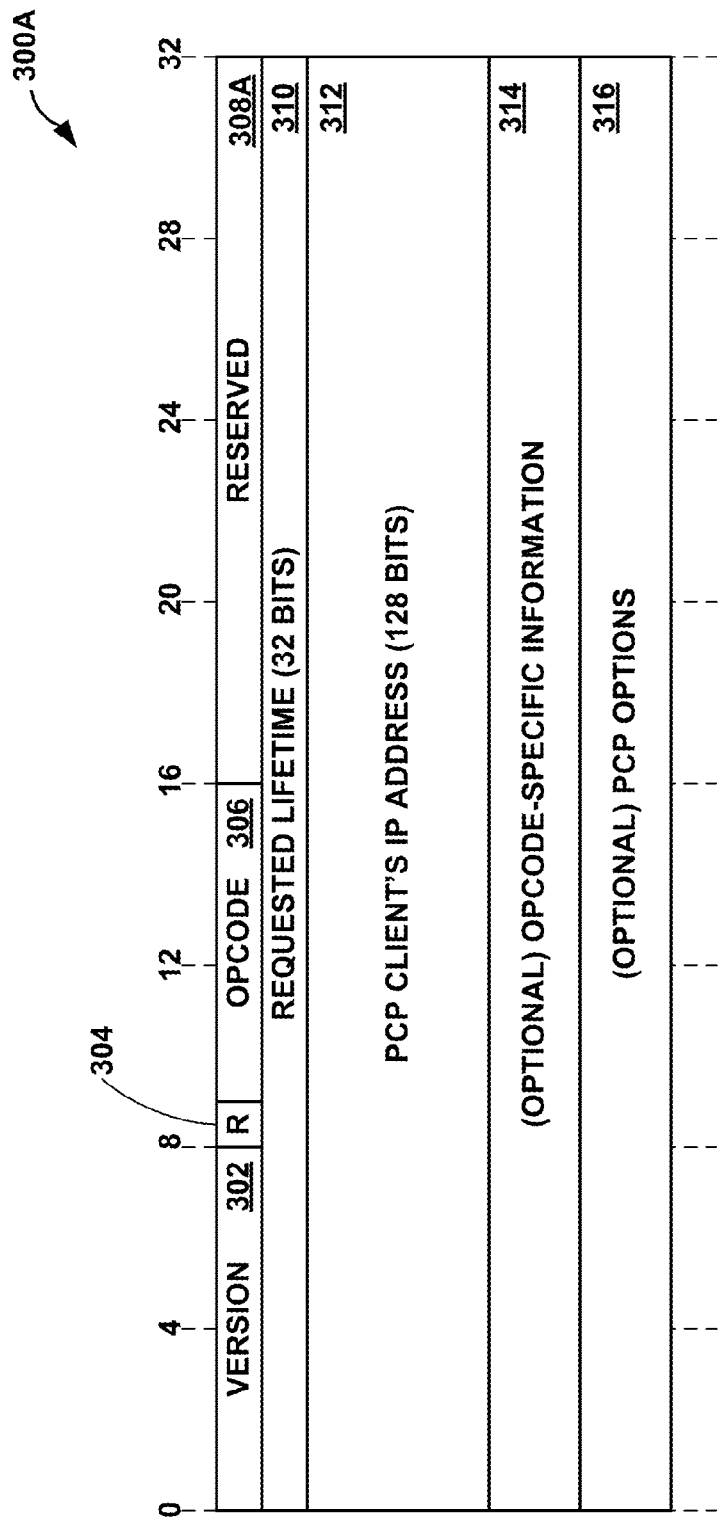
FIGS. 3 and 4 are conceptual diagrams illustrating example Port Control Protocol (PCP) request headers as revised to utilize the techniques of this disclosure.
Figure 4:
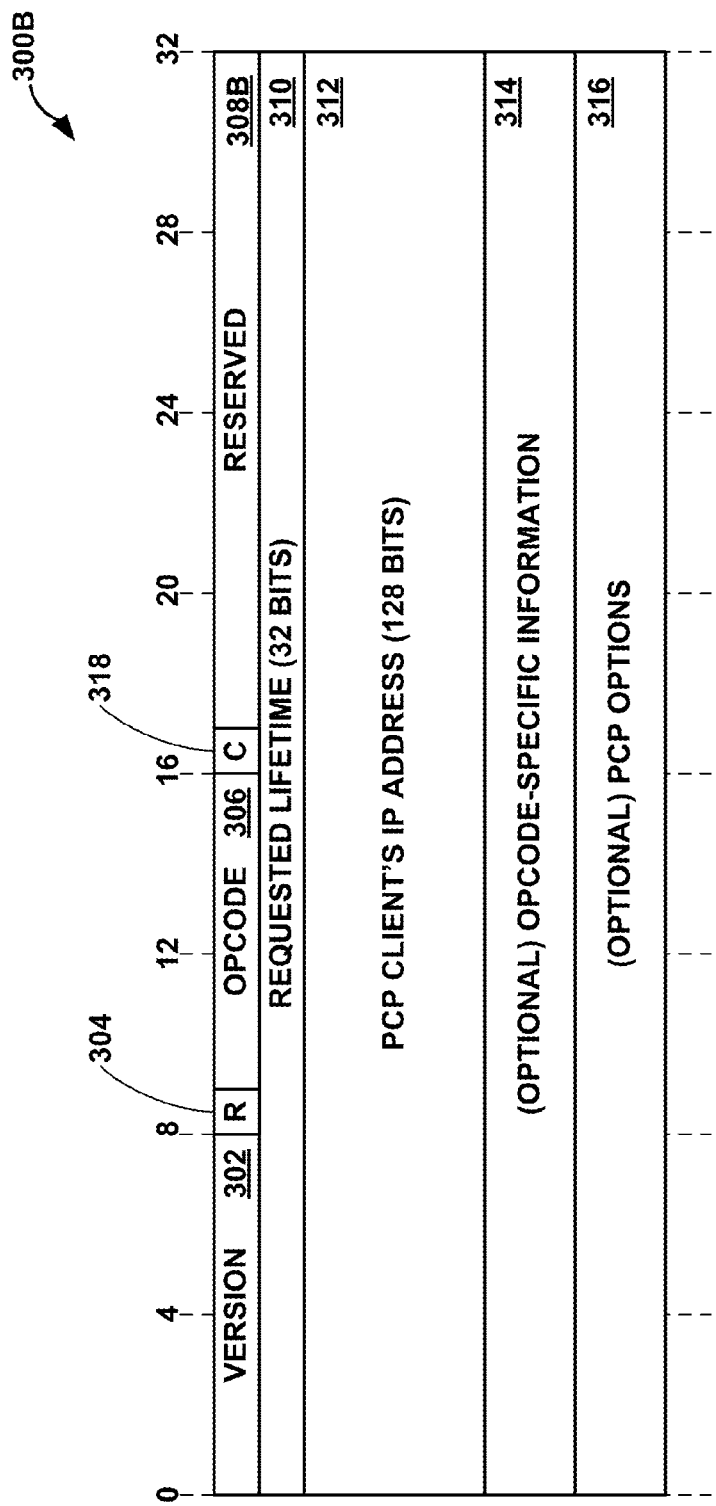

FIGS. 3 and 4 are conceptual diagrams illustrating example Port Control Protocol (PCP) request headers 300A, 300B as revised to utilize the techniques of this disclosure. In particular, FIG. 3 illustrates PCP request header 300A, while FIG. 4 illustrates PCP request header 300B. In accordance with the techniques of this disclosure, a client device may include data indicating that a network connection is critical (and, thus, should be checkpointed for high availability) in a PCP request header, such as PCP request headers 300A, 300B. In the example of FIG. 3, PCP request header 300A includes version value 302, R value 304, opcode value 306, reserved field 308, requested lifetime value 310, PCP client's IP address value 312, opcode-specific information 314, and PCP options 316. Opcode-specific information 314 and PCP options 316 are optional and not necessarily included in PCP request headers 300A, 300B. As explained in greater detail below, one or more bits of reserved field 308A may be syntactically and semantically defined to indicate whether a corresponding network connection is critical, such as bit C 318 of FIG. 4, resulting in a modified reserved field such as reserved field 308B of FIG. 4.

Version value 302 specifies a version of the PCP protocol being used. For instance, PCP clients and servers in conformance with RFC 6887 specify a value of "2" for version value 302. R value 304 indicates whether the corresponding PCP message is a request or a response. RFC 6887 defines a value of "0" for a corresponding PCP message as a request, and a value of "1" as a response. Opcode value 306 is a 7-bit value that specifies an operation to be performed.

Reserved field 308A of FIG. 3 includes 16 reserved bits, for which RFC 6887 does not assign semantics. However, in accordance with the techniques of this disclosure, a client device may specify data in one or more bits of reserved field 308 that indicate whether a corresponding network connection is critical and should be checkpointed for high availability. For instance, as shown in FIG. 4, a first bit of reserved field 308A in FIG. 3 is repurposed an identified as bit C 318. Bit C 318 may be assigned a value indicating whether a corresponding network connection is considered critical. In some examples, a value of 1 for bit C 318 may indicate that the network connection is not critical (and, thus, that network state for the network connection should not be checkpointed for high availability), whereas a value of 0 for bit C 318 may indicate that the network connection is critical (and, thus, should be checkpointed for high availability). Thus, in the example of FIG. 4, reserved field 308B includes 15 bits, rather than the full 16 bits of reserved field 308A of FIG. 3.

Although bit C 318 is shown as an ordinal first bit of reserved field 308A, reserved field 308A may be modified to include data conceptually similar to that of bit C 318 in any portion of reserved field 308A (e.g., one or more bits of any position of reserved field 308A). Moreover, additional bits of reserved field 308A may be assigned semantic values for other extensions to PCP.

Requested lifetime value 310 is an unsigned 32-bit integer, defined in seconds, that ranges from 0 to $2^{32}-1$ seconds. In general, requested lifetime value 310 indicates a requested lifetime for a corresponding network connection.

PCP client's IP address 312 has a value indicative of an IPv4 or IPv6 address used by the PCP client when sending a request including one of PCP request headers 300A, 300B. For instance, a value of PCP client's IP address 312 may correspond to the IP address of one of mobile devices 19. NAT device 41 may use this IP address to detect an unexpected NAT on a path between the PCP client and NAT device 41 or other device (e.g., a firewall).

Opcode-specific information 314 includes payload data that corresponds to an opcode specified in opcode value 306. The length of opcode-specific information 314 is variable, and this data is considered optional. Opcode-specific information 314 may specify an internal port and a suggested external port, e.g., when opcode value 306 specifies a MAP Opcode. In this manner, the corresponding message may specify a public port (e.g., external port) and an internal port corresponding to a port of a client device. PCP options 316 includes zero or more options for the opcode specified in opcode value 306. When the techniques of this disclosure are used to indicate that a particular connection (e.g., network address and port combination) is critical, it is assumed that opcode 306 has a value for which opcode-specific information 314 specifies a port.

Figure 5:
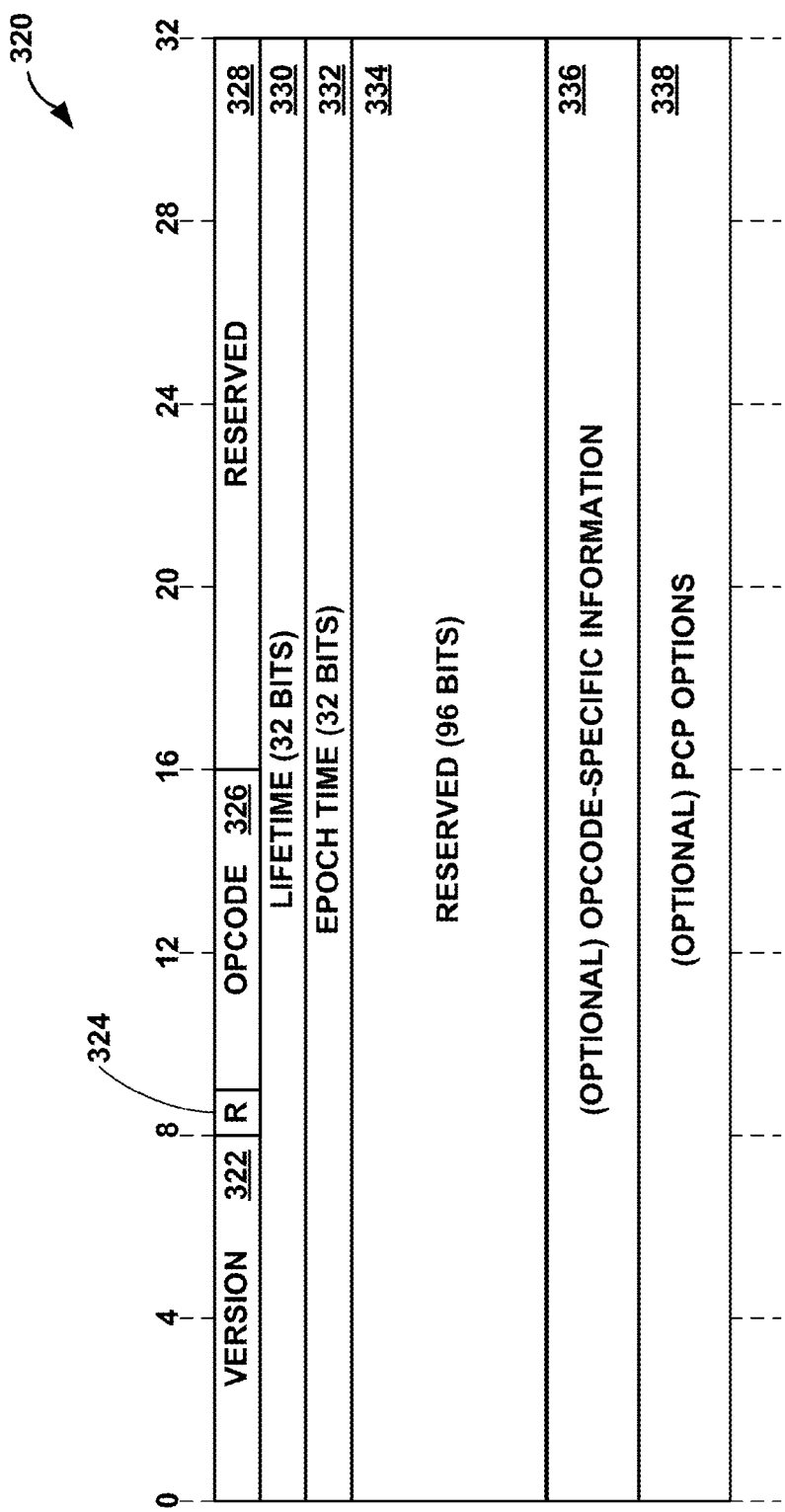
FIG. 5 is a conceptual diagram illustrating an example PCP response header, which may include data for use in accordance with the techniques of this disclosure.

FIG. 5 is a conceptual diagram illustrating an example PCP response header 320, which may include data for use in accordance with the techniques of this disclosure. In some examples, NAT device 41 may begin checkpointing data of a network connection corresponding to a PCP request (including a header similar to one of PCP request headers 300A, 300B of FIGS. 3, 4) when data of the PCP request (e.g., bit C 318 of FIG. 4) indicates that the network connection is critical, before sending a PCP response including a PCP response header similar to PCP response header 320 in response to the PCP request.

In the example of FIG. 5, PCP response header 320 includes version field 322, R value 324, opcode value 326, reserved field 328, lifetime value 330, epoch time value 332, reserved field 334, opcode-specific information 336, and PCP options data 338. Version value 322 has a value of 2 when the PCP response complies with RFC 6887. As defined by RFC 6887, R value 324 has a value of 1 to indicate that the corresponding PCP message is a PCP response. That is, NAT device 41 sets version value 332 to a value of 2 and R value 324 to a value of 1 when constructing a PCP response including PCP header 320.

Opcode value 326 specifies an opcode. Typically, NAT device 41 copies the value from the corresponding PCP request opcode value (e.g., opcode value 306 of FIGS. 3, 4) into opcode value 326 for a PCP response that is sent in response to the PCP request.

Reserved field 328 and reserved field 334 include sets of reserved bits for future extensions to RFC 6887. In accordance with the techniques of this disclosure, one or more bits of reserved field 328 and/or reserved field 334 may be assigned syntax and semantics relating to a response to a PCP request that indicates that a network connection is critical. For example, NAT device 41 may include data in one or more bits of reserved field 328 and/or reserved field 334 indicating whether the corresponding network connection will be checkpointed for high availability. However, it should be understood that a response indicating whether checkpointing will be performed is optional and not necessary.

Lifetime value 330 includes an unsigned 32-bit integer value, in seconds ranging from 0 to $2^{32}-1$ seconds. In an error response, NAT device 41 specifies how long a client device should assume the same error response will occur from NAT device 41 if the same request is repeated. On a success response for certain PCP opcodes, lifetime value 330 indicates a lifetime of a mapping between network addresses.

Epoch value 332 represents an epoch time for NAT device 41.

Opcode-specific information 336 includes payload data for the opcode specified by opcode value 326. Opcode-specific information 336 may specify an internal port and a suggested external port, e.g., when opcode value 326 specifies a MAP Opcode. In this manner, the corresponding message may specify a public port (e.g., external port) and an internal port corresponding to a port of a client device. Likewise, PCP options data 338 includes zero or more options that are legal for both a PCP response and the opcode specified by opcode value 326.

Figure 6:
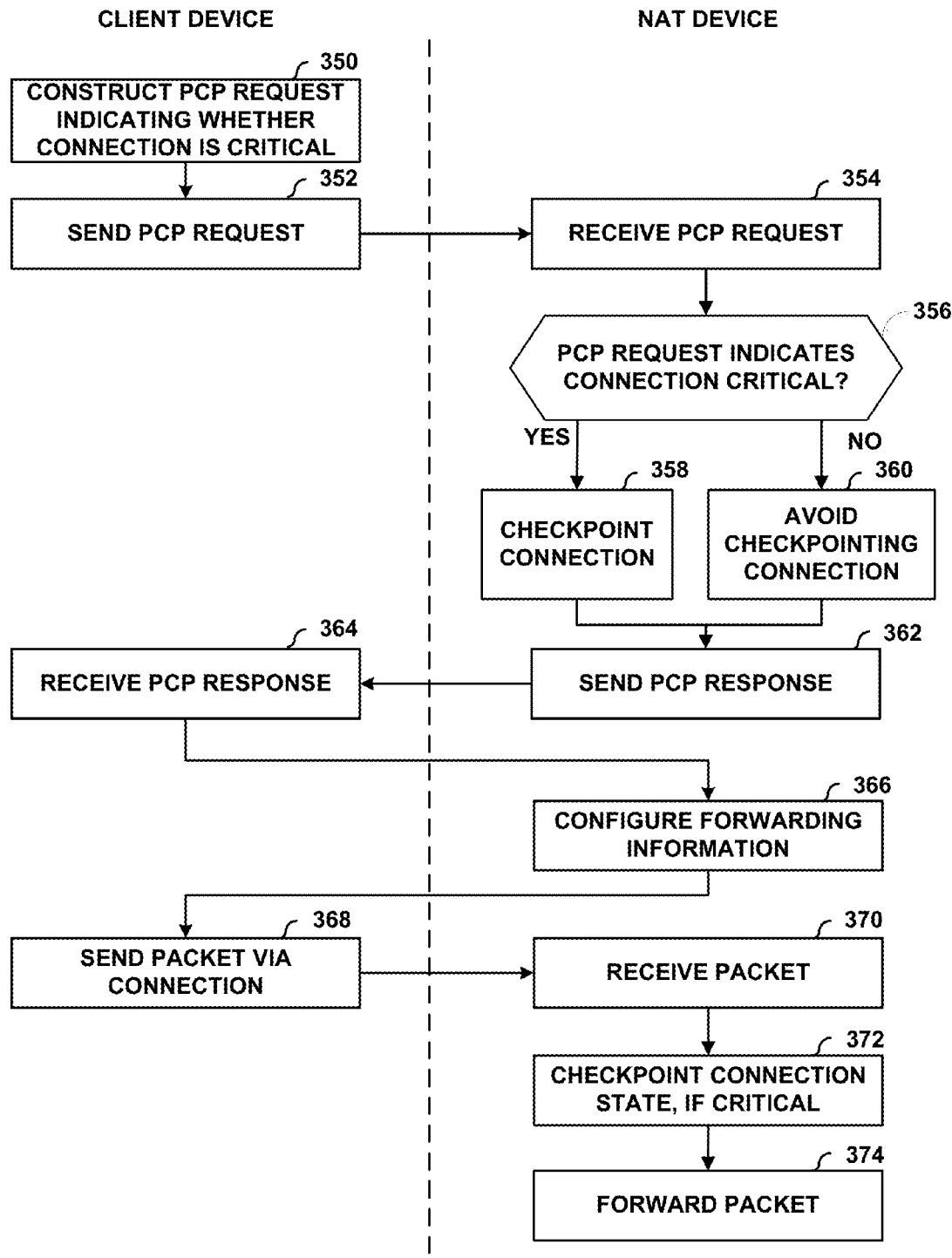
FIG. 6 is a flowchart illustrating an example method for performing the techniques of this disclosure.

FIG. 6 is a flowchart illustrating an example method for performing the techniques of this disclosure. In the example of FIG. 6, the method is explained as being performed by a client device and a NAT device. One of mobile devices 19 (FIG. 1) may act as the client device, while NAT device 41 (FIG. 1) may act as the NAT device. Thus, the method of FIG. 6 is explained with respect to mobile device 19A and NAT device 41. However, other client and intermediate network devices may be configured to perform the method of FIG. 6.

Initially, mobile device 19A constructs a PCP request indicating whether a network connection, corresponding to the PCP request, is critical (350). For example, mobile device 19A may determine that a network connection is critical in response to a request from a user or based on specific configuration data. For instance, the configuration data may include a list of applications (e.g., including a voice-over-IP (VOIP) application) for which network connections are deemed critical. Construction of such a PCP request may follow a determination that the connection is critical, e.g., based on user input, configuration data (which may indicate types of connections that are to be considered critical), or the like.

After determining whether a network connection is critical, mobile device 19A generates a message in accordance with a protocol for reserving a public IP address and port for the network connection (e.g., a PCP request) indicating that the connection is critical. As discussed with respect to FIGS. 3 and 4, to indicate whether the network connection is critical, mobile device 19A may set a value for bit C 318 (FIG. 4), which would otherwise be part of reserved field 308A (FIG. 3), to indicate that the connection is critical. For example, a value of 0 for bit C 318 may indicate that the network connection is critical, whereas a value of 1 for bit C 318 may indicate that the network connection is not critical. As discussed herein, a network connection that is considered critical means that the network connection should be checkpointed, for the purposes of high availability. Mobile device 19A then sends the request (e.g., the PCP request) to NAT device 41 (352).

Subsequently, NAT device 41 receives the PCP request (354). NAT device 41 then determines whether the PCP request indicates that the network connection corresponding to the PCP request is critical (356). For example, NAT device 41 may inspect the value of bit C 318 of a PCP header for the PCP request, as illustrated in FIG. 4. NAT device 41 may determine whether the value of bit C 318 indicates that the network connection is critical.

In the event that the PCP request indicates that the network connection is critical ("YES" branch of 356), NAT device 41 elects to checkpoint data for the corresponding network connection (358). For example, NAT device 41 may configure forwarding information of NAT device 41 (e.g., FIB 234 and/or data of flow control unit 275) such that data received for the network connection is directed to a high availability service card of service cards 233 (FIG. 2), which replicates state data for the connection to a backup device (e.g., a backup one of service cards 233 or a backup NAT device, separate from NAT device 41). In some examples, NAT device 41 begins checkpointing data for the network connection before sending a PCP response in response to the PCP request. In this manner, NAT device 41 may checkpoint state data for a network connection without regard for a duration of the network connection.

On the other hand, when the PCP request indicates that the network connection is not critical ("NO" branch of 356), NAT device 41 avoids checkpointing state data for the network connection (360). In some examples, e.g., where NAT device 41 is configured with a limit on the number of network connections that can be checkpointed, NAT device 41 avoids checkpointing state data for the network connection when the limit is reached or exceeded. In this case, the network connection may either proceed without checkpointing or mobile device 19A may wait until the network connection can be checkpointed before initiating the network connection.

In any case, NAT device 41 may then send a PCP response (362). Thus, as discussed above, NAT device 41 may begin checkpointing data for the network connection before sending the PCP response. Assuming that the PCP request indicated that the network connection was critical, NAT device 41 may include data in the PCP response indicating whether checkpointing for the network connection will be performed or not. Mobile device 19A may then receive the PCP response (364).

It should be understood that the PCP request is also used in accordance with the principles of using PCP for NAT. That is, the PCP request may also reserve a public IP address and a port for the network connection. NAT device 41 may therefore configure forwarding information (e.g., FIB 234 of FIG. 2) thereof to map the public IP address and the port to mobile device 19A (366). For instance, the public IP address and port may be mapped to an IP address and port of mobile device 19A. In this manner, when a server device (e.g., of public network 21) directs network traffic (e.g., network packets) to the reserved public IP address and the port, and when NAT device 41 receives such traffic, NAT device 41 can correctly forward the network traffic to mobile device 19A, based on the mapping between the reserved, public IP address and port and the actual IP address and port associated with mobile device 19A.

Assuming that mobile device 19A elects to proceed with the network connection, mobile device 19A subsequently sends one or more packets via the network connection (368). When NAT device 41 receives such packets (370), NAT device 41 checkpoints state data for the connection if the connection has been designated as critical (372). That is, NAT device 41 may send data representative of the connection state to a backup device, e.g., a backup NAT device (i.e., a backup service blade or separate device operating in a hot standby mode). In some examples, NAT device 41 sends such state information to the backup device at periodic intervals, rather than in response to each packet. For example, NAT device 41 may send state data to the backup device after every N sequence numbers and/or every N acknowledgement numbers. NAT device 41 may also forward the packets to a server device, e.g., a server device of public network 21 (FIG. 1).

In some examples, checkpointing of data may include checkpointing data indicative of a service state for a service associated with the network connection. In this manner, a failover may occur in which the backup device resumes primary responsibility for providing the service for the network connection. Such a failover event may be voluntary or involuntary, where voluntary failovers may occur when a primary device is taken offline for service and/or maintenance, and involuntary failovers may occur when a primary device or a network connection thereto fails unintentionally.

Although not shown in FIG. 6, when NAT device 41 receives data as part of the network connection from the server device, NAT device 41 may determine that the data is directed to the reserved IP address and port for mobile device 19A. Thus, using the previously configured forwarding information, which maps the reserved, public IP address and port to mobile device 19A, NAT device 41 forwards such received packets to mobile device 19A. NAT device 41 may also checkpoint data of this data received from the server device, assuming that the network connection was indicated as being critical.

In this manner, the method of FIG. 6 represents an example of a method including receiving, in a message according to a protocol for reserving a public address and port for a network connection, an indication that the network connection is to be checkpointed for high availability, receiving one or more packets of a packet flow associated with the public address and the port for the network connection, and, based on the indication, checkpointing data of at least one of the received packets.

The method of FIG. 6 also represents an example of a method including determining, by a client device, whether a network connection associated with the client device and a network device is to be checkpointed for high availability, wherein the network device comprises a primary service device that provides a high availability service, constructing, by the client device, a message according to a protocol for reserving a public network address and port to be used for the network connection, such that the message includes an indication of whether the network connection is to be checkpointed for high availability based on the determination, and sending, by the client device, the message to the network device.

It should be understood that the method of FIG. 6 may be performed at any time with respect to the establishment of the network connection. For instance, the method of FIG. 6 may be performed before the network connection has been established, or after the network connection has been established. Thus, checkpointing of state data for the network connection may begin after the network connection has been operative for any arbitrary length of time. In cases where the network connection has already been established, mobile device 19A may still include the indication of whether the network connection is considered critical in a PCP request message, but the PCP request message including the indication that the network connection is critical need not also request to reserve a public address and port for the network connection, because presumably, this mapping would have already occurred.

Although the techniques of this disclosure are primarily described with respect to network address translation (NAT), it should be understood that these techniques may be used in conjunction with other services. For instance, these techniques may be used in conjunction with an Internet protocol security (IPsec) service. When applying the techniques of this disclosure to IPSec, the messages described above may be used only to indicate that a network connection is critical, without reserving a public network address and/or ports. In some examples, IPSec and NAT may be performed together for a single network connection. Moreover, other services in addition to or in the alternative to IPSec and NAT may be applied to a network connection, for which the techniques of this disclosure may be applied as well. That is, the techniques of this disclosure may be applied when checkpointing state data for any service, and NAT and IPSec are described merely as examples of services for which state data may be checkpointed.

Figure 7:
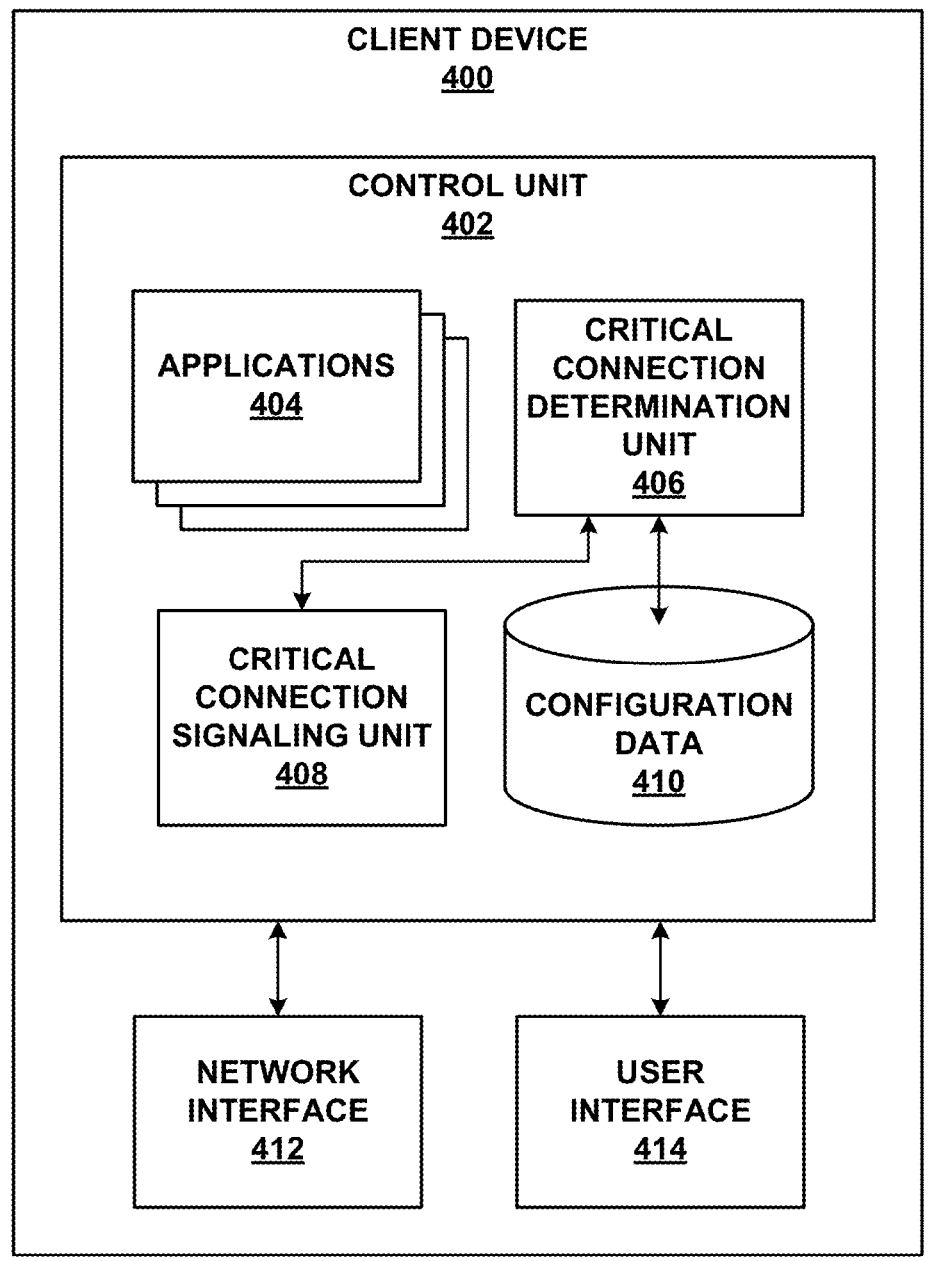
FIG. 7 is a block diagram illustrating an example client device in accordance with the techniques of this disclosure.

FIG. 7 is a block diagram illustrating an example client device 400 in accordance with the techniques of this disclosure. Client device 400 may correspond to one of mobile devices 19 of FIG. 1. Any or all of mobile devices 19 and/or may include components similar to those of client device 400. In the example of FIG. 7, client device 400 includes control unit 402, network interface 412, and user interface 414. Network interface 412 may comprise one or more elements for communicating via a computer-based network, such as a network interface card (NIC) that provides Ethernet access, a wireless network interface card conforming to one or more wireless networking protocols, e.g., IEEE 802.11 protocols, or the like.

User interface 414 represents one or more user interfaces for providing output to and/or receiving input from a user. For instance, user interface 414 may comprise a screen, a touchscreen, a physical keyboard, a pointing device such as a mouse or trackpad, speakers, a microphone, a camera, accelerometers, hard keys, or the like. As explained below, client device 400 may receive input from a user via user interface 414 indicating that a particular network connection is critical.

Control unit 402 may represent hardware or a combination of hardware with software and/or firmware. Thus, when including software or firmware, it should be understood that requisite hardware may be included in control unit 402, such as one or more processing units and one or more computer-readable storage media that store instructions corresponding to the software or firmware. The processing units may include any processing circuitry, such as one or more microprocessors, digital signal processors (DSPs), application-specific integrated circuits (ASICs), field programmable gate arrays (FPGAs), or the like.

Control unit 402 is configured to execute a set of applications 404, which may be stored in a computer-readable storage medium of control unit 402 and executed by a processing unit of control unit 402. Applications 404 may comprise any of a variety of applications for client device 400, such as email applications, web browsers, calendars, games, music players, texting applications, telephone applications (which may use voice over IP (VOIP)), video chat applications, or the like.

Control unit 402 also includes critical connection determination unit 406, critical connection signaling unit 408, and configuration data 410. In accordance with the techniques of this disclosure, critical connection determination unit 406 is configured to determine whether a particular network connection is critical, that is, should be checkpointed for high availability. In particular, whether a network connection is critical may influence whether a network device that provides a service, such as NAT, IPSec, or other stateful services (e.g., NAT device 41) checkpoints state data of the network connection such that, if the network device fails, a backup network device can resume performance of the service with respect to the network connection.

Configuration data 410 may store data indicative of whether network connections of particular types are to be considered critical. For instance, configuration data 410 may indicate that network connections associated with particular applications of applications 404 are to be treated as critical, and hence, should receive checkpointing for high availability. As one example, configuration data 410 may indicate that all network connections carrying VOIP data are to be considered critical.

Thus, critical connection determination unit 406 may determine whether a network connection associated with one of applications 404 is considered critical, and hence, whether high availability checkpointing should be performed for the connection. Additionally or alternatively, critical connection determination unit 406 may receive input from a user via user interface 414 indicative of whether a network connection should be considered critical. Critical connection determination unit 406 may determine whether the network connection is critical prior to the network connection being established or after the network connection has been established. Although shown separately for purposes of example, critical connection determination unit 406 may be included within one or more of applications 404, in some examples. For instance, a VOIP application may provide data directly to critical connection signaling unit 408 that a network connection associated with the VOIP application is critical.

Critical connection signaling unit 408 (which, in some examples, may comprise a PCP client) may receive data from critical connection determination unit 406 indicative of whether a network connection is considered critical, and hence, whether high availability checkpointing should be applied to the network connection. Based on this data, critical connection signaling unit 408 may construct a message associated with the network connection, where the message is indicative of whether the network connection is critical. For example, critical connection signaling unit 408 may construct a PCP message including a header as discussed with respect to FIGS. 3, 4 above. That is, critical connection signaling unit 408 may construct a PCP message having a header including a bit (e.g., bit C 318) in a reserved field, where critical connection signaling unit 408 sets a value for the bit to indicate whether a corresponding network connection is to be checkpointed for high availability. Alternatively, critical connection signaling unit 408 may indicate whether a network connection is critical by setting a value for a different bit of reserved field 308A, or using a different message for another protocol for reserving a public network and port for a network connection.

In some examples, critical connection determination unit 406 may determine that a network connection is and is not critical at various times during the network connection. For instance, while an established network connection is in a not-critical state, critical connection determination unit 406 may determine that the network connection has become critical. Thus, following this determination, critical connection determination unit 406 may send data to critical connection signaling unit 408 that the network connection is now considered critical. In response, critical connection signaling unit 408 may send a message as discussed above indicating that the network connection is critical and thus should be checkpointed for high availability. Similarly, a network connection in a critical state may be later deemed not critical by critical connection determination unit 406. As such, critical connection signaling unit 408 may signal that a network connection is, or is not, critical any number of times while the network connection exists.

In this manner, client device 400 represents an example of a client device that includes one or more processors configured to determine whether a network connection associated with the client device and a network device is to be checkpointed for high availability and to construct a message according to a protocol for reserving a public network address and port to be used for the network connection, such that the message includes an indication of whether the network connection is to be checkpointed for high availability based on the determination, wherein the network device comprises a primary service device that provides a high availability service, and one or more network interfaces configured to send the message to the network device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
    receiving, in a message according to a protocol for reserving a public network address and port to be used for a network connection associated with a client device, an indication that the network connection is to be checkpointed for high availability;
    receiving one or more packets of a packet flow associated with the public network address and the port for the network connection; and
    based on the indication, checkpointing, by a primary service device, data of at least one of the received packets to a backup service device for the primary service device.

2. The method of claim 1, wherein the protocol for reserving the public network address and the port comprises Port Control Protocol (PCP).

3. The method of claim 2, wherein the message comprises a PCP request, and wherein receiving comprises receiving a zero-valued bit in a reserved field of a header of the PCP request, wherein the zero-valued bit comprises the indication.

4. The method of claim 1, wherein receiving the indication comprises receiving the message after the network connection has been established.

5. The method of claim 1, wherein receiving the indication comprises receiving the message before the network connection has been established.

6. The method of claim 1, further comprising performing at least one service for the network connection, wherein checkpointing the data comprises checkpointing the data to provide high availability for the at least one service.

7. The method of claim 6,
wherein the message reserves a mapping between the public network address and port and a private network address and port of the client device for the network connection; and
wherein the at least one service comprises a network address translation (NAT) service that processes packets of the network connection to translate, within the packets, between the public network address and port and the private network address and port.

8. The method of claim 6, wherein the at least one service comprises an Internet Protocol Security (IPsec) service.

9. The method of claim 1, further comprising performing a failover from the primary service device to the backup service device.

10. The method of claim 1, wherein checkpointing the data comprises checkpointing at least one of a current sequence number for the packet flow and a current acknowledgement number for the packet flow.

11. The method of claim 1, wherein checkpointing the data comprises checkpointing without regard for a duration of the network connection.

12. A network device comprising:
one or more network interfaces configured to receive a message according to a protocol for reserving a public network address and port to be used for a network connection associated with a client device and to receive one or more packets of a packet flow associated with the public network address and the port for the network connection; and
one or more processors comprising a primary service device, wherein the processors are configured to determine whether the message includes an indication that the network connection is to be checkpointed for high availability, and wherein the primary service device is configured to, based on the indication, checkpoint data of at least one of the received packets to a backup service device for the primary service device.

13. The network device of claim 12, wherein the protocol for reserving the public network address and the port comprises Port Control Protocol (PCP).

14. The network device of claim 13, wherein the message comprises a PCP request, and wherein the one or more processors are configured to determine that a zero-valued bit in a reserved field of a header of the PCP request comprises the indication that indicates that the network connection is to be checkpointed.

15. The network device of claim 12, wherein the one or more network interfaces receive the message after the network connection has been established.

16. The network device of claim 12, wherein the one or more network interfaces receive the message before the network connection has been established.

17. The network device of claim 12, wherein the one or more processors are configured to perform at least one service for the network connection, and wherein to checkpoint the data, the one or more processors are configured to checkpoint the data to provide high availability for the at least one service.

18. The network device of claim 17, wherein the message reserves a mapping between the public network address and port and a private network address and port of the client device for the network connection, and wherein the at least one service comprises a network address translation (NAT) service that processes packets of the network connection to translate, within the packets, between the public network address and port and the private network address and port.

19. The network device of claim 17, wherein the at least one service comprises an Internet Protocol Security (IPsec) service.

20. The network device of claim 12, wherein the primary service device is configured to perform a failover to the backup service device.

21. The network device of claim 12, wherein the one or more processors are configured to checkpoint at least one of a current sequence number for the packet flow and a current acknowledgement number for the packet flow.

22. The network device of claim 12, wherein the one or more processors are configured to checkpoint data for the packet flow without regard for a duration of the network connection.

23. A non-transitory computer-readable storage medium comprising instructions that, when executed, cause a processor of a primary service device to:
receive, in a message according to a protocol for reserving a public network address and port for a network connection, an indication that the network connection is to be checkpointed for high availability;
receive one or more packets of a packet flow associated with the public network address and the port for the network connection; and
based on the indication, checkpoint data of at least one of the received packets to a backup service device for the primary service device.

24. A method comprising:
determining, by a client device, whether a network connection associated with the client device and a network device is to be checkpointed for high availability, wherein the network device comprises a primary service device that provides a high availability service;
constructing, by the client device, a message according to a protocol for reserving a public network address and port to be used for the network connection, such that the message includes an indication of whether the network connection is to be checkpointed for high availability based on the determination; and
sending, by the client device, the message to the network device.

25. The method of claim 24, wherein the protocol for reserving the public network address and the port comprises Port Control Protocol (PCP).

26. The method of claim 25, wherein the message comprises a PCP request, and wherein constructing comprises constructing the PCP request to include a value for a bit in a reserved field of a header of the PCP request, wherein the bit in the reserved field comprises the indication of whether the network connection is to be checkpointed for high availability.

27. The method of claim 26, wherein constructing comprises:
in response to determining that the network connection is to be checkpointed for high availability, setting the bit to have a value of zero; and
in response to determining that the network connection is not to be checkpointed for high availability, setting the bit to have a value of one.

28. The method of claim 24, wherein determining comprises determining whether the network connection is to be checkpointed for high availability based on configuration data of the client device.

29. The method of claim 24, wherein determining comprises determining whether the network connection is to be checkpointed for high availability based on input received from a user.

30. The method of claim 24, wherein sending the message comprises sending the message after the network connection has been established.

31. The method of claim 24, wherein sending the message comprises sending the message before the network connection has been established.

32. The method of claim 24, wherein determining comprises determining that the network connection is to be checkpointed for high availability, the method further comprising requesting that the network device perform at least one service for the network connection, wherein the message is constructed to cause the primary service device to checkpoint state data associated with the at least one service to a backup service device for the primary service device using the high availability service.

33. The method of claim 32, wherein the at least one service comprises at least one of network address translation (NAT) or Internet Protocol Security (IPsec).

34. A client device comprising:
one or more processors configured to determine whether a network connection associated with the client device and a network device is to be checkpointed for high availability and to construct a message according to a protocol for reserving a public network address and port to be used for the network connection, such that the message includes an indication of whether the network connection is to be checkpointed for high availability based on the determination, wherein the network device comprises a primary service device that provides a high availability service; and
one or more network interfaces configured to send the message to the network device.

35. The client device of claim 34, wherein the protocol for reserving the public network address and the port comprises Port Control Protocol (PCP).

36. The client device of claim 35, wherein the message comprises a PCP request, and wherein the processors are configured to construct the PCP request to include a value for a bit in a reserved field of a header of the PCP request, wherein the bit in the reserved field comprises the indication of whether the network connection is to be checkpointed for high availability.

37. The client device of claim 36, wherein the processors are configured to, in response to determining that the network connection is to be checkpointed for high availability, set the bit to have a value of zero, and, in response to determining that the network connection is not to be checkpointed for high availability, set the bit to have a value of one.

38. The client device of claim 34, wherein the processors are configured to determine whether the network connection is to be checkpointed for high availability based on at least one of configuration data of the client device or input received from a user.

39. A computer-readable storage medium having stored thereon instructions that, when executed, cause a processor of a client device to:
determine whether a network connection associated with the client device and a network device is to be checkpointed for high availability, wherein the network device comprises a primary service device that provides a high availability service;
construct a message according to a protocol for reserving a public network address and port to be used for the network connection, such that the message includes an indication of whether the network connection is to be checkpointed for high availability based on the determination; and
send the message to the network device.

* * * * *